United States Patent [19]

Chinzei et al.

[11] Patent Number: 5,166,719
[45] Date of Patent: Nov. 24, 1992

[54] EYE-CUP COVER FOR A VIEWFINDER

[75] Inventors: Akiko Chinzei, Kanagawa; Kaori Setohigashi, Saitama; Akinari Mori, Tokyo, all of Japan

[73] Assignee: Sony Corporation, Japan

[21] Appl. No.: 691,407

[22] Filed: Apr. 25, 1991

[30] Foreign Application Priority Data

May 28, 1990 [JP] Japan ................................. 2-137881

[51] Int. Cl.⁵ .............................................. G03B 13/02
[52] U.S. Cl. .................................... 354/219; 354/287; 359/600
[58] Field of Search ........................... 354/219–225, 354/288, 287; 350/579–581; 359/600

[56] References Cited

U.S. PATENT DOCUMENTS

| | | | |
|---|---|---|---|
| 4,576,459 | 3/1986 | Miura et al. | 354/287 |
| 4,796,034 | 1/1989 | Leonard et al. | 354/288 X |
| 4,833,494 | 5/1989 | Ohsawa | 354/219 |

*Primary Examiner*—Russell E. Adams
*Assistant Examiner*—David M. Gray
*Attorney, Agent, or Firm*—Ronald P. Kananen

[57] ABSTRACT

An eye-cup cover for a viewfinder comprising a ring cover detachably attached to an eye-cup body. According to this eye-cup cover for a viewfinder, when a female user, for example, utilizes a camera, the female user can be protected from losing makeup. Also, the user who wears glasses can handle a camera with ease, and the his or her can make user's own fashionable camera by selecting the color tone of the ring cover.

5 Claims, 6 Drawing Sheets

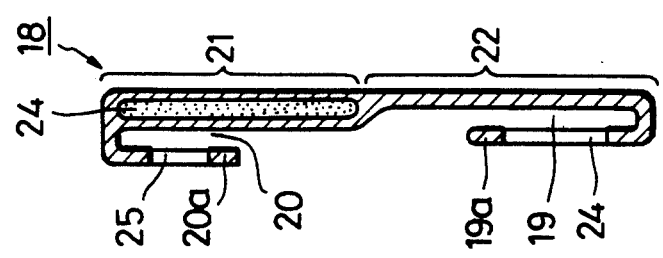
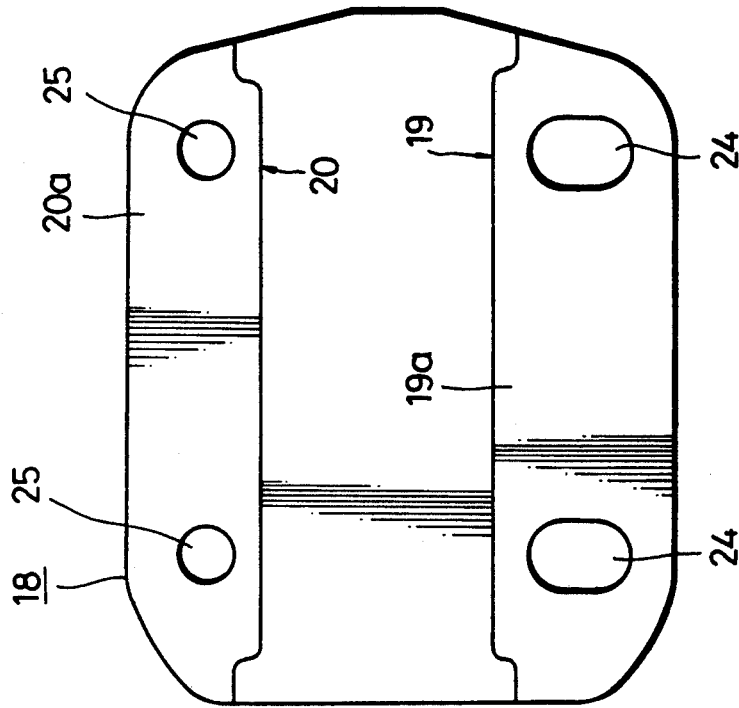
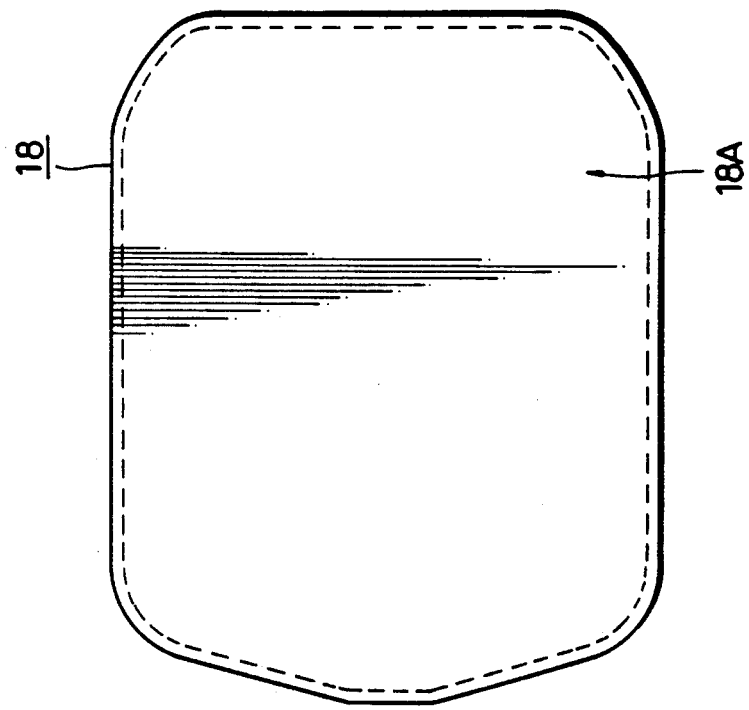

EYE-CUP COVER FOR A VIEWFINDER

BACKGROUND OF THE INVENTION

1. Field of the Invention

The present invention generally relates to an eye-cup cover for a viewfinder and, more particularly, is directed to an eye-cup cover attached to a viewfinder of camera, such as a video camera, a standard still camera or the like.

2. Description of the Prior Art

A so-called small video camera having a video tape recorder portion and an image pickup camera portion unitarily formed as one body is now commercially available on the market and has become very popular.

Generally, in this small video camera, a rubber eye-cup is detachably attached to the ocular portion of the viewfinder, and the video camera is wholly colored in black because the black video camera is suitably mass-produced.

Incidentally, the rubber eye-cup is attached to the ocular portion of the prior-art small video camera as described above, and this conventional rubber eye-cup has disadvantages such as that the eye-cup is smudged by a makeup of female user and that some user suffer from a rash round the eye because the eye-cup is made of rubber. Furthermore, the eye-cup is not so easy to handle particularly for the user who wears glasses, and if the user who wears glasses uses the same eye-cup after the female user has used it, then the eye-cup smudged by the makeup will smudge the glasses.

OBJECTS AND SUMMARY OF THE INVENTION

Accordingly, it is an object of the present invention to provide a novel eye-cup cover for a viewfinder in which the aforenoted shortcomings and disadvantages encountered with the prior art can be eliminated substantially.

More specifically, it is an object of the present invention to provide a colorful eye-cup cover for a viewfinder.

Another object of the present invention is to provide an eye-cup cover for a viewfinder which can be substantially prevented from being smudged by the makeup of a female user.

Still another object of the present invention is to provide an eye-cup cover for a viewfinder which is easy to handle for the user who wears glasses.

A further object of the present invention is to provide an eye-cup cover for a viewfinder which can protect the user from a rash around the eye.

According to an aspect of the present invention, an eye-cup cover for a viewfinder is comprised of a ring cover detachably attached to an eye-cup body.

The above, and other objects, features and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 5A is a front view illustrating an example of a grip belt cover used in the present invention;

FIG. 5B is a rear view of the same;

FIG. 5C is a cross-sectional view of the same;

DETAILED DESCRIPTION OF THE PREFERRED EMBODIMENT

The present invention will now be described with reference to the accompanying drawings.

Before describing the embodiment of the present invention, a video tape recorder (VTR) having a built-in type camera 1 to which the present invention can be applied will be described initially with reference to FIGS. 7A and 7B which illustrate this video camera 1 in the opposing directions, respectively.

Figure 7A:
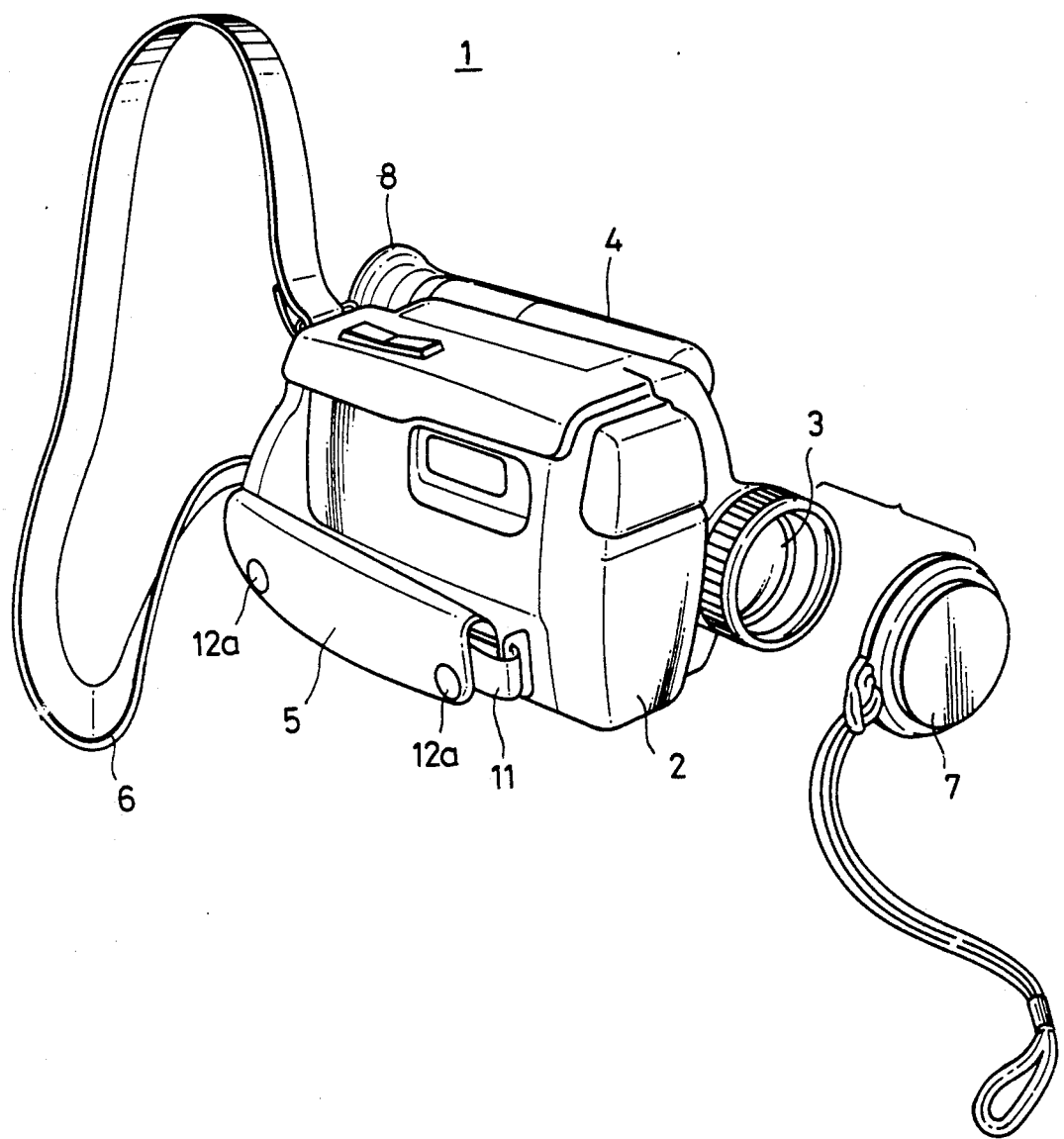
FIG. 7A is a perspective view illustrating a video camera to which the present invention is applied.
Figure 7B:
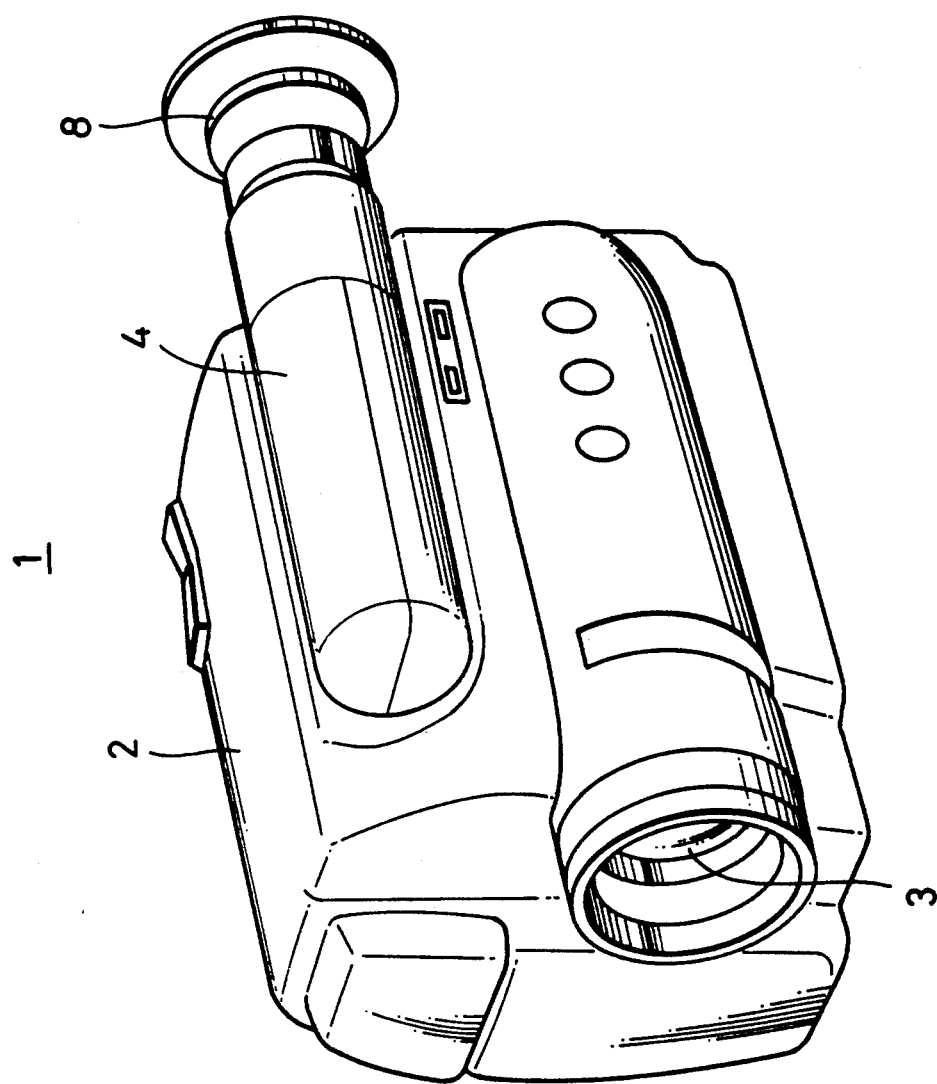
FIG. 7B is a perspective view illustrating the same video camera in the direction opposite to that of FIG. 7A.

Referring to FIGS. 7A and 7B, the video camera 1 is composed of a video camera body 2, a camera lens 3 and a viewfinder 4. The viewfinder 4 is rotatably mounted on the video camera body 2 so that the former can upwardly rotate about its base portion. Further, a grip belt 5 and a shoulder belt 6 are attached to the video camera body 2 and the camera lens 3 is protected by a lens cap 7.

Figure 1:
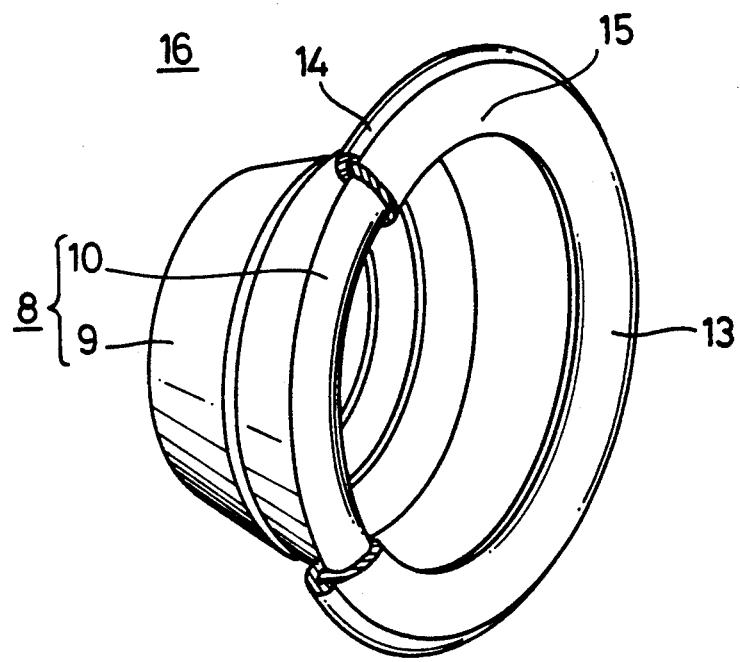
FIG. 1 is a partially cutaway perspective view illustrating an embodiment of an eye-cup cover for a viewfinder of a camera according to the present invention.
Figure 2:
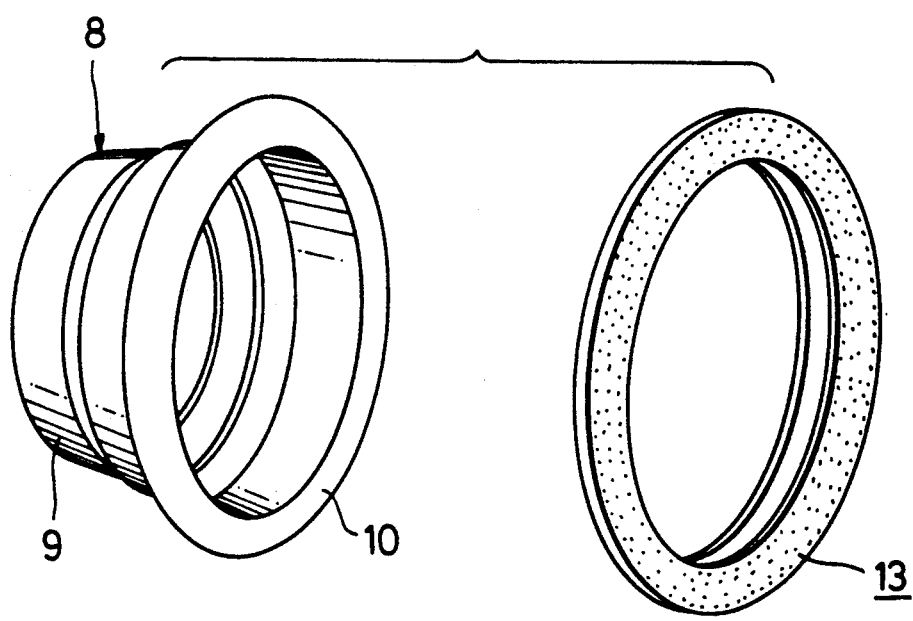
FIG. 2 is an exploded perspective view of the same.
Figure 3:
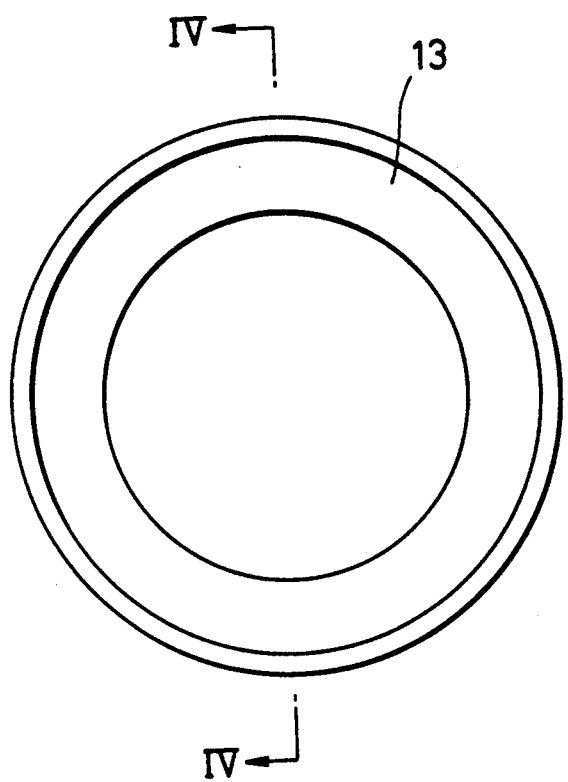
FIG. 3 is a front view illustrating a ring cover according to the present invention.
Figure 4:
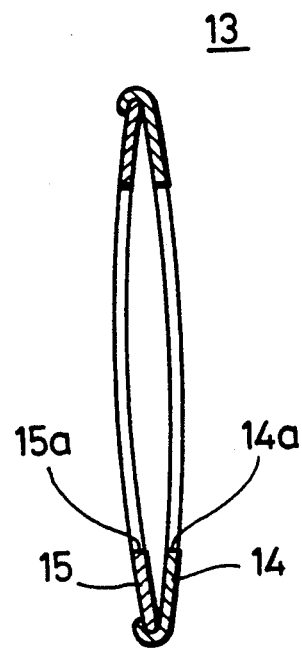
FIG. 4 is a cross-sectional view taken along the line IV—IV of FIG. 3.

An eye-cup body 8 is made of rubber and detachably attached to the ocular portion of the viewfinder 4. As shown in FIG. 1, the eye-cup body 8 comprises a cylindrical portion 9 which may engage with the tube of the viewfinder 4 and an ocular flange portion 10 unitarily formed with the cylindrical portion 9.

Figure 6:
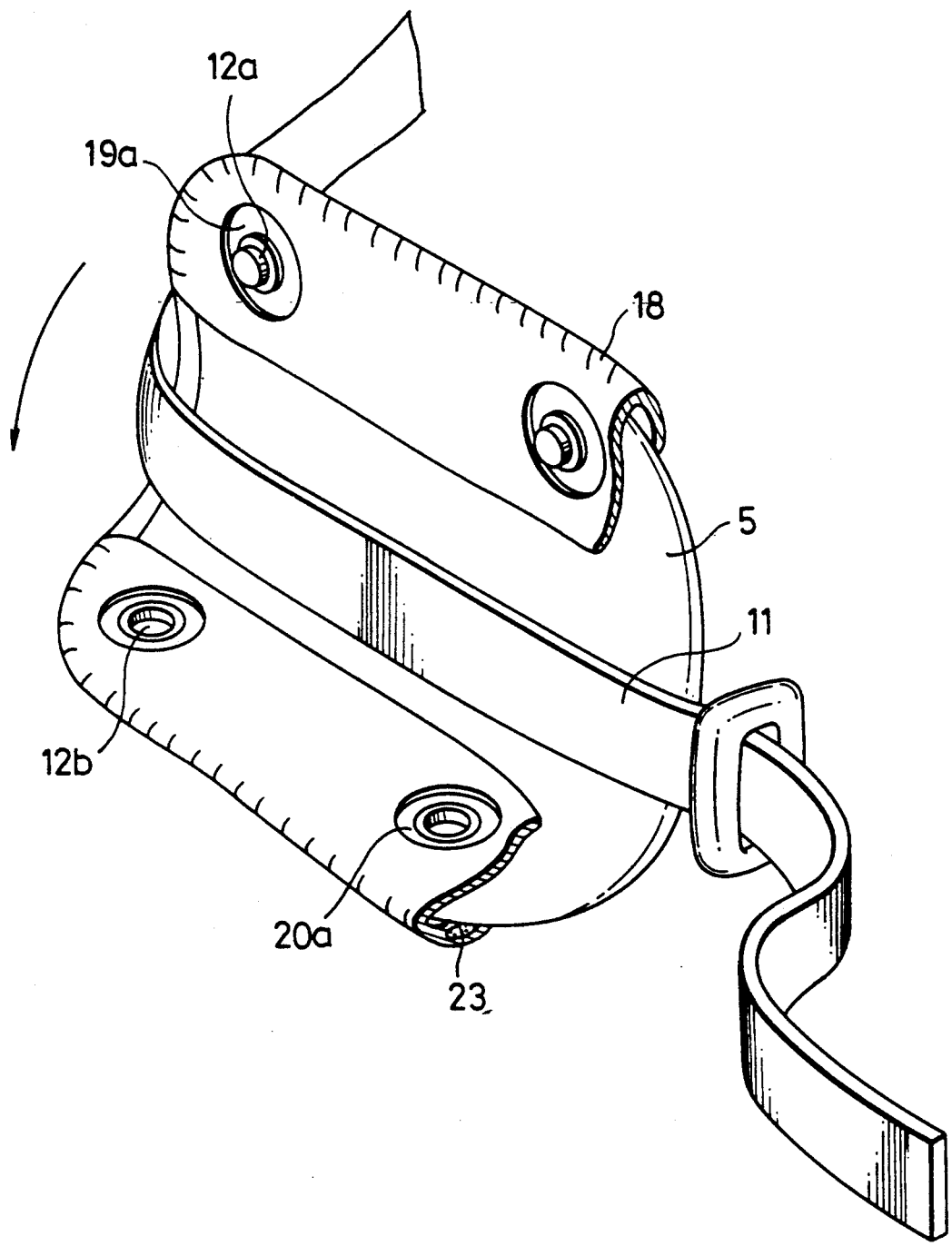
FIG. 6 is a perspective view illustrating the condition such that the grip belt cover is attached to a grip belt.

Turning back to FIGS. 7A and 7B, the grip belt 5 is fixed to an adjusting belt 11 which is fastened to the video camera body 2 by screws. As, for example, shown in FIG. 6 which shows the grip belt 5 in its opened state, male buttons 12a and female buttons 12b are provided on the inner surface of the grip belt 5 at both upper and lower ends thereof. The grip belt 5 is folded to grip the adjusting belt 11 therein and then the male buttons 12a are engaged with the female buttons 12b, respectively, whereby the grip belt 5 is attached to the adjusting belt 11 as shown in FIG. 7A.

In general, the video camera body 2, the viewfinder 4, the eye-cup body 8, the grip belt 5 and the adjusting belt 11 are all black in color.

According to the embodiment of the eye-cup cover for a viewfinder of the present invention, as shown in FIGS. 1 to 4, a ring cover 13 is detachably attached to the eye-cup body 8 to form an eye-cup 16. The ring cover 13 is formed by bonding a pair of ring-shaped sheets 14 and 15 having central apertures 14a and 15a of the same diameter along their outer peripheral edges in a bag-like fashion. In this case, the ring-shaped sheet 15 of the rear surface (i.e. ocular portion surface side) is made of a material which can be substantially protected from being smudged by the makeup, e.g., foundation of female user. By way of example, the ring-shaped sheet 15 is a man-made cloth of polyvinyl chloride (PVC)

provided as a base material on which nylon fibers are woven to present velvet-like smoothness and appearance. Further, the color of the ring-shaped sheet 15 is selected to be a proper one (e.g., grey) such that, even when the sheet 15 is smudged by the makeup, such smudge does not become conspicuous.

On the other hand, the ring-shaped sheet 14 of the front surface is made of a PVC sheet of bright color tone, such as pink, violet, yellowish green, yellow, blue or the like. In that case, the ring-shaped sheet 14 of the front surface is coupled to the ring-shaped sheet 15 of the rear surface in such a manner that the ring-shaped sheet 14 turns its elongated outer peripheral edge toward the ring-shaped sheet 15.

When the video camera 1 is in use, the ring cover 13 is loosely fitted into the eye-cup body 8 of the viewfinder 4. The ring cover 13 is attached to the eye-cup body 8 such that, after the eye-cup body 8 is removed from the viewfinder 4 for a moment and the ring cover 13 is fitted into the eye-cup body 8, the eye-cup body 8 is mounted on the viewfinder 4 again.

The ring cover 13 is attached to the viewfinder 4 as described above so that, when the female user, for example, looks into the viewfinder 4, she feels the ring cover 13 very soft and smooth because the rear surface of the sheet 15 is made soft like velvet. Therefore, the female user can be substantially protected from losing her makeup or protected from a rash around her eye. Further, even if the ring-shaped sheet 15 is smudged with makeup, the smudged sheet 15 can be protected from becoming conspicuous because the color of the sheet 15 is neutral, thus making smudges inconspicuous. Even when the surface of the sheet 15 is smudged with makeup, the ring cover 13 is removed from the eye-cup body 8 and the sheet 15 can be rinsed with water, thus the ring cover 13 is kept clean. Furthermore, since the ring cover 13 is made soft as described above, the user who wears spectacles can handle the video camera 1 with ease. In addition, since the sheet 14, i.e., the surface of the ring cover 13 is brightly colored as described above, this video camera 1 is excellent from a fashion standpoint.

According to the embodiment of the present invention, as shown in FIGS. 5A through 5C and FIG. 6, a grip belt cover 18 can be freely attached to and detached from the grip belt 5, and in use, the grip belt cover 18 is attached to the grip belt 5. The grip belt cover 18 is dimensioned so as to nearly correspond to the grip belt 5 when the grip belt 5 is unfolded. Further, the grip belt cover 18 has pouch portions 19 and 20 formed at the upper and lower portions thereof to receive respective ends of the grip belt 5. As shown in FIGS. 5A–5C, the grip belt cover 18 is formed of first and second half portions 21 and 22. The first half portion 21 corresponds to the inside of the grip cover belt 18 when the user puts his hand into the space between the grip belt cover 18 and the video camera body 2, and this first half portion 21 is provided with a sponge 23 to increase the thickness thereof as compared with the second half portion 22. The pouch portions 19 and 20 are formed of inner sheets 19a and 20a, respectively, and these inner sheets 19a and 20a have apertures 24 and 25 to expose the male and female buttons 12a, 12b of the grip belt 5 when the belt grip cover 18 is attached to the grip belt 5. A front sheet 18A of the grip belt cover 18 is made of a material of bright color tone, such as pink, violet, yellowish green, yellow, blue and so on.

In use, the grip belt cover 18 is fitted to the grip belt 5 so as to cover the surface of the grip belt 5.

As described above, since the grip belt cover 18 of desired color is fitted to the grip belt 5 of original color as described above, the user can enjoy this small size video camera 1 also from a fashion standpoint. In addition, since the inside of the grip belt cover 18 is made thick by the sponge 23 to thereby substantially reduce the space within the grip belt 5 in which the user puts his hand, the grip belt 5 can be well fitted to the small hand of a female user and thus the video camera 1 becomes easy to handle.

If the colors of, for example, the ring cover 13 mounted on the eye-cup body 8 and of the grip belt cover 18 fitted to the grip belt 5 are selected in accordance with the taste of the user and if the colors of the shoulder belt 6 and of the lens cap 7 are selected to be the same as those of the ring cover 13 and the grip belt cover 18, then the user will be able to make user's own video camera. Therefore, the user is satisfied with user's own special video camera and can enjoy this more fashionable video camera.

While the present invention is applied to the video camera as described above, the present invention is not limited thereto and may be applied to other cameras such as a standard still camera and so on.

According to the eye-cup cover for a viewfinder of the present invention, even when the female user, for example, uses the eye-cup, the eye-cup can be prevented from being smudged by the makeup of the female user. Therefore, undesired smudges can be reduced and the female user can be protected from losing the makeup. Further, since the eye-cup cover of the present invention is made soft, the user who wearing glasses can handle the video camera with ease.

Furthermore, since the ring cover is detachable, the eye-cup portion can be changed in a variety of colors by selecting the color of the ring cover, thus making it possible for the user to enjoy the fashionable video camera.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. An eye-cup for a viewfinder comprising:
   an eye-cup body and
   a ring cover, said ring cover being detachably mountable on said eye-cup body, wherein said ring cover further comprises first and second annular sheets having apertures of the same diameter wherein said first and second annular sheets are affixed at their outer edges such that their inner edges are disposed in a spaced relationship between one another.

2. The eye-cup cover for a viewfinder according to claim 1, wherein said first annular sheet is made of an artificial cloth which effectively resists being smudged by make-up of a user.

3. The eye-cup for a viewfinder according to claim 1, wherein said first annular sheet is made of an artificial cloth comprising polyvinyl chloride onto which nylon fibers are woven to provide a velvet texture.

4. The eye-cup for a viewfinder according to claim 1, wherein said first annular sheet is made of an artificial cloth having a neutral color such that, even if said first annular sheet is smudged by make-up, said make-up remains inconspicuous.

5. An eye-cup for a viewfinder according to claim 1, wherein said second ring-shaped sheet is formed from polyvinyl chloride of a desired color.

* * * * *